(12) United States Patent  
Bill et al.

(10) Patent No.: US 10,723,331 B2  
(45) Date of Patent: Jul. 28, 2020

(54) CONTROLLING VEHICLE BRAKES

(71) Applicant: Airbus Operations Limited, Bristol (GB)

(72) Inventors: Andrew Bill, Bristol (GB); David Joel Clarke, Bristol (GB)

(73) Assignee: Airbus Operations Limited, Bristol (GB)

( * ) Notice: Subject to any disclaimer, the term of this patent is extended or adjusted under 35 U.S.C. 154(b) by 120 days.

(21) Appl. No.: 16/013,157

(22) Filed: Jun. 20, 2018

(65) Prior Publication Data

US 2018/0370504 A1 Dec. 27, 2018

(30) Foreign Application Priority Data

Jun. 21, 2017 (GB) .................................. 1709900.3

(51) Int. Cl.
*B60T 8/17* (2006.01)
*B60T 8/32* (2006.01)
(Continued)

(52) U.S. Cl.
CPC ............ *B60T 8/1703* (2013.01); *B60T 8/172* (2013.01); *B60T 8/325* (2013.01); *B60T 13/662* (2013.01); *B60T 17/221* (2013.01); *B64C 25/44* (2013.01); *B60T 2250/04* (2013.01); *F16D 65/126* (2013.01); *F16D 2200/0052* (2013.01)

(58) Field of Classification Search
CPC ........ B60T 8/1703; B60T 8/172; B60T 8/325; B60T 13/662; B60T 17/221; B60T 2250/04; B64C 25/44; F16D 65/126; F16D 2200/0052
See application file for complete search history.

(56) References Cited

U.S. PATENT DOCUMENTS

2007/0271019 A1* 11/2007 Dellac ................... B64C 25/426
 701/70
2014/0180505 A1* 6/2014 Vaney ....................... B60T 8/00
 701/3
2017/0008503 A1* 1/2017 Romana .................. B60T 8/885

FOREIGN PATENT DOCUMENTS

EP 0 610 115 8/1994
EP 0 928 740 7/1999
(Continued)

OTHER PUBLICATIONS

Combined Search and Examination Report for GB1709900.3 dated Dec. 12, 2017, 5 pages.
(Continued)

*Primary Examiner* — Aaron L Troost
(74) *Attorney, Agent, or Firm* — Nixon & Vanderhye P.C.

(57) ABSTRACT

An apparatus for controlling braking of a vehicle having a plurality of brake-packs. The apparatus includes a controller configured to receive a first plurality of input values having a first scatter value; calculate an adjustment factor for each brake-pack based on the received first plurality of input values; output a control signal to cause each brake-pack of the plurality of brake-packs to be applied at a pressure based on the adjustment factor calculated for that brake-pack; and receive a second plurality of input values having a second scatter value. Each input value relates to a different one of the plurality of brake-packs. The adjustment factors are calculated such that the second scatter value is less than or equal to the first scatter value.

14 Claims, 3 Drawing Sheets

(51) Int. Cl.
*B60T 17/22* (2006.01)
*B60T 13/66* (2006.01)
*B60T 8/172* (2006.01)
*B64C 25/44* (2006.01)
*F16D 65/12* (2006.01)

(56) References Cited

FOREIGN PATENT DOCUMENTS

| | | |
|---|---|---|
| EP | 1732796 | 12/2006 |
| EP | 3 115 266 | 1/2017 |
| FR | 3 008 368 | 1/2015 |

OTHER PUBLICATIONS

European Search Report cited in EP 18 17 6664 dated Aug. 28, 2018, 7 pages.

\* cited by examiner

CONTROLLING VEHICLE BRAKES

RELATED APPLICATION

This application claims priority to United Kingdom (GB) patent application no. 1709900.3, filed Jun. 21, 2017, the entire contents of which is hereby incorporated by reference.

TECHNICAL FIELD

The present invention relates to an apparatus for controlling braking of a vehicle having a plurality of brake-packs.

BACKGROUND

Regulations require aircraft brakes to be able to handle an aborted takeoff at any moment prior to the plane leaving the runway. Brakes should not exceed a specified temperature, to avoid performance degradation. Current design prohibits an aircraft from taking off if its brakes are too hot (e.g. carbon temperature above 400° C., corresponding to an indicated temperature of about 300° C.). To ensure that the brakes are cool enough even after use during taxiing out to the runway, it is recommended that an aircraft is not dispatched if its brakes are above a predefined temperature (e.g. 150° C., as measured by a brake temperature sensor), which is significantly lower than the maximum permitted take-off temperature and allows for temperature increase during taxi braking.

Application of the brakes of an aircraft can be instigated (demanded) by the flight crew applying pressure to the brake pedals, or by an auto-brake function. When such a braking demand is made, the hydraulic pressure is increased in a number of braking pistons, which apply force to press together the rotors and stators within the brake pack. Assuming that the same braking demand is made of each landing gear (e.g. by the flight crew applying pressure to each brake pedal), the hydraulic pressure in each brake-pack of a landing gear is assumed to be equal.

However; applying equal hydraulic pressure to each brake-pack does not necessarily result in optimal braking performance, or in an optimal turnaround time. Each brake-pack has a brake gain, which defines how much torque is developed per unit of pressure applied. This brake gain can vary from brake-pack to brake-pack (e.g. due to manufacturing tolerances), meaning that each brake-pack may develop a different level of braking torque for the same level of applied pressure.

Furthermore, each brake-pack may be in a different state of wear. Where this is the case, if the torque (and therefore the energy) developed by each brake-pack is identical, each brake-pack will heat at a different rate, with the heating rate being determined by the brake mass. Consequently, each brake-pack will reach a different peak temperature, and will take a different amount of time to cool down to a target temperature suitable for pushback from the stand. If the torque developed by each brake-pack is also different, due to variation in brake gain as explained above, differences in peak temperature and cooling time between the brake-packs may be even more significant.

SUMMARY

A first aspect of the present invention provides an apparatus for controlling braking of a vehicle having a plurality of brake-packs. The apparatus comprises a controller configured to receive a first plurality of input values having a first scatter value; calculate an adjustment factor for each brake-pack based on the received first plurality of input values; output a control signal to cause each brake-pack of the plurality of brake-packs to be applied at a pressure based on the adjustment factor calculated for that brake-pack; and receive a second plurality of input values having a second scatter value. Each input value relates to a different one of the plurality of brake-packs. The adjustment factors are calculated such that the second scatter value is less than or equal to the first scatter value.

Optionally, the controller is operable in a first mode in which each input value is a value of a first parameter, and in a second mode in which each input value is a value of a second, different, parameter. Optionally, the apparatus is configured to operate the controller in either the first mode or the second mode based on a current state of the vehicle. Optionally, the apparatus is configured to operate the controller in the first mode if a predefined first mode criterion is met, and to operate the controller in the second mode if a predefined second mode criterion is met. Optionally, in the first mode each input value is a torque value indicating an amount of torque reacted by a different one of the plurality of brake-packs. Optionally, in the second mode each input value is a cooling time value indicating a predicted time required for a different one of the plurality of brake-packs to reach a predetermined temperature.

Optionally, the predefined first mode criterion comprises a minimum ground speed of the vehicle, and is defined such that it is met when a ground speed of the vehicle is greater than the minimum ground speed. Optionally, the predefined second mode criterion comprises a maximum ground speed of the vehicle, and is defined such that it is met when a ground speed of the vehicle is less than the maximum ground speed. Optionally, the predefined second mode criterion comprises a minimum brake temperature, and is defined such that it is met when the temperatures of the brake-packs of the vehicle are all above the minimum brake temperature.

Optionally, the controller is further operable in a third mode in which each input value is a value of a third parameter, and the apparatus is configured to operate the controller in the third mode if a predefined third mode criterion is met. Optionally, the third parameter is brake-pack temperature, and the predefined third mode criterion comprises a maximum ground speed of the vehicle and a minimum brake temperature, and is defined such that it is met when a ground speed of the vehicle is less than the maximum ground speed and the temperature of at least one brake-pack is below the minimum brake temperature. Optionally, the predefined third mode criterion is defined such that it is met when a ground speed of the vehicle is less than the maximum ground speed and the temperatures of all the brake-packs are below the minimum brake temperature.

Optionally, the apparatus is configured to receive vehicle state information comprising one or more of: current ground speed of the vehicle; temperature of each brake-pack; current flight cycle phase. Optionally, the apparatus is configured to select an operating mode of the controller based on the received vehicle state information.

Optionally, the vehicle is an aircraft. Optionally, each brake-pack is a carbon brake-pack.

A second aspect of the present invention provides an aircraft comprising a plurality of brake-packs; a plurality of torque sensors; a source of brake temperature information; a brake cooling prediction system; and an apparatus according to the first aspect. Each torque sensor is configured to measure the torque reacted by a different one of the plurality of brake-packs. The source of brake temperature information is for generating a value of the temperature of each different one of the plurality of brake-packs. The brake cooling prediction system is for predicting a time required by each brake-pack to reach a predetermined temperature. The apparatus is in communication with the plurality of torque sensors, the source of brake temperature information, and the brake cooling prediction system. The apparatus is configured to receive the first plurality of input values and the second plurality of input values from a selected source comprising one of: the plurality of torque sensors; the source of brake temperature information; and the brake cooling prediction system. The source is selected based on a current state of the aircraft.

Optionally, the aircraft further comprises a ground speed sensor in communication with the apparatus, and the apparatus is configured to receive ground speed information from the ground speed sensor. Optionally the apparatus is configured to select the source based on the received ground speed information.

Optionally, the apparatus is configured to receive brake temperature information from the source of brake temperature information, and to select the source based on the received brake temperature information.

BRIEF DESCRIPTION OF THE DRAWINGS

Embodiments of the invention will now be described, by way of example only, with reference to the accompanying drawings, in which.

DETAILED DESCRIPTION

The examples described herein relate to a Brake Temperature & Torque Control (BTTC) apparatus, for controlling the operation of a vehicle's brakes. The described examples relate to aircraft, and it is envisaged that the invention will have particular advantages when used on an aircraft, but it may also be beneficially implemented on other types of vehicle.

Braking performance can be improved by ensuring that equal torque is developed by each brake-pack during a brake application, because this ensures that each brake-pack provides the same stopping power. Where the vehicle is an aircraft, or any other vehicle for which an operational cycle typically includes a brake cooling period, turnaround time (TAT) can be improved by ensuring that the torque developed from each brake-pack results in a brake-pack temperature for which the time to cool to a target temperature is the same as for every other brake-pack on the vehicle.

Figure 2:
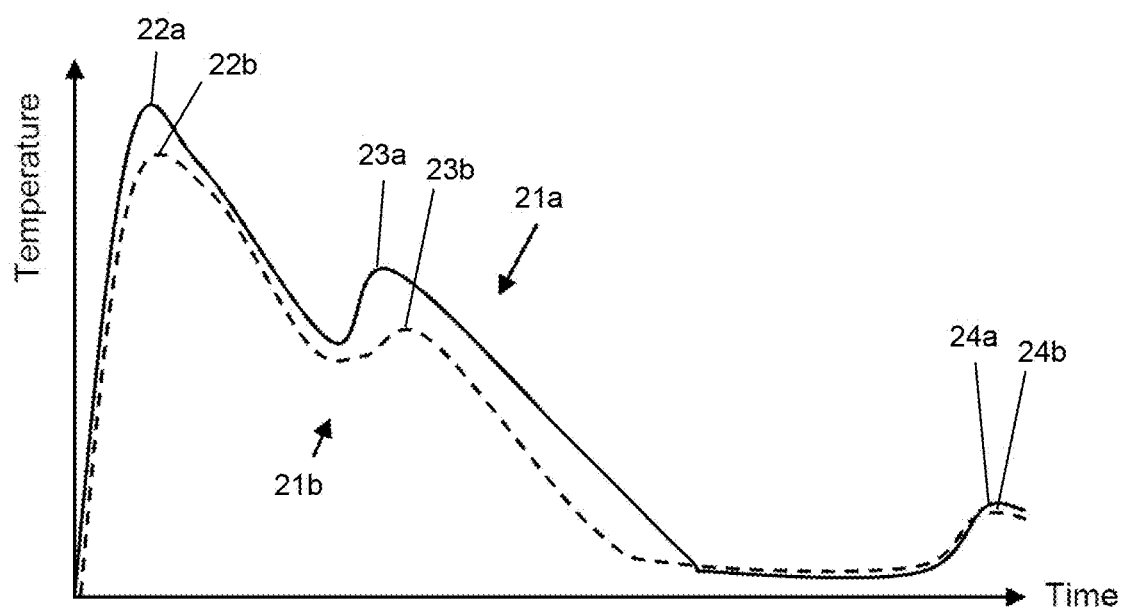
FIG. 2 shows an example plot of brake temperature against time for two different brake-packs of a vehicle.

FIG. 2 shows an example plot 21a of a time-series of values of the temperature of a first brake-pack of an aircraft and an example plot 21b of a time-series of values of the temperature of a second brake of the aircraft. Each plot covers a first period during which main landing braking (represented by the peaks 22a, 22b) occurred, a second period during which the brake-packs were cooling following main landing braking (including minor peaks 23a, 23b representing a braking snub during taxi-in), and a third period during which the brake-packs were at ambient temperature (so no further cooling occurred), until a further braking snub (represented by the peaks 24a, 24b) occurred during taxi-out. In this example, the braking pressure is evenly distributed between the first and second brake-packs. The first and second brake-packs are on the same axle and therefore they exhibit similar thermal behaviour. However; it can be seen that the first brake-pack reaches a higher peak temperature as a result of each braking application. This could be, for example, because the first brake-pack is more worn and therefore has less mass than the second brake-pack. The heating and cooling rates are also slightly different between the two brake-packs. As a result of these differences, the first brake-pack reaches ambient temperature at a later time than the second brake-pack.

The example BTTC apparatus seek to achieve the advantages of improved braking performance and reduced TAT by distributing braking pressure between the braked wheels in a selected manner, to achieve a selected outcome. Where the vehicle is an aircraft, the selected outcome (and therefore the selected manner in which the BTTC apparatus distributes the brake pressure) may vary in dependence on the flight cycle phase. In particular, the example BTTC apparatus may seek to control the scatter of brake torques, brake temperatures or cooling times between different brake-packs of a vehicle (because of differences in brake gain and brake mass) without altering a total amount of braking provided by the brakes.

It will be appreciated that scatter of brake torques, brake temperatures and brake cooling times cannot be simultaneously controlled. The relative impact of variances in these different parameters differs depending on the operational situation of the vehicle. For an aircraft, the relative impact of variances in brake torques, temperatures and cooling times will differ depending on flight cycle phase. As such, some of the example BTTC apparatus seek to achieve optimum braking performance and TAT can be achieved by controlling different parameters during different flight cycle phases.

Figure 1:
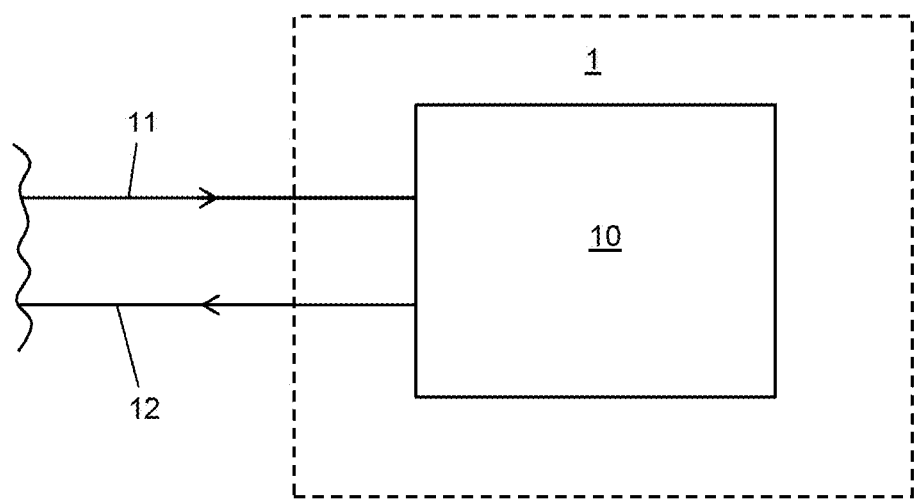
FIG. 1 shows a schematic view of an apparatus for controlling braking of a vehicle according to an example.

FIG. 1 shows an example BTTC apparatus 1. The BTTC apparatus 1 can be used to control braking of a vehicle having a plurality of brake-packs, and in particular to control braking of an aircraft during landing and taxiing. In the following description, the term "brake application" is used to refer to any operation of the vehicle's brakes during which a certain level of braking pressure is applied by each brake-pack (e.g. to press together brake discs of the brake-pack) to achieve an overall braking pressure corresponding to a "demanded braking pressure" demanded by an operator of a vehicle (which may be a human operator or an automatic system). A brake application causes energy to be input to the brake-packs and therefore the temperature of the brake-packs to increase. A brake application is typically performed for the purpose of slowing the vehicle.

The BTTC apparatus 1 comprises a controller 10, which is connected by a communications link 11 to at least one source of input data and is also connected by a communications link 12 to a braking controller of a vehicle on which the BTTC apparatus is installed. The source of input data (which does not form part of the present invention) may be any system or mechanism able to provide a data signal to the controller 10, such as an aircraft avionics system, a monitoring system, a sensor, or the like. The braking controller (which does not form part of the present invention) may be any system or mechanism which is able to cause the brakes of the vehicle to be applied in response to an input signal. In particular, the braking controller is able to cause each brake-pack of the vehicle to apply a particular pressure specified by an input signal, which may be different for different brake-packs. In some examples the braking controller is an aircraft braking control system. Each of the communications links 11, 12 may be wired, wireless, or part wired and part wireless. In some examples the BTTC apparatus 1 is comprised in an aircraft braking control system. At least some components of the BTTC apparatus 1 can be configured to receive power via a connection to an aircraft avionics system.

The controller 10 is configured to receive a first plurality of input values having a first scatter value, wherein each input value relates to a different one of the plurality of brake-packs, via the communications link 11. Each input value of the plurality of input values is of the same type (that is, the input values are values of the same parameter). The number of input values comprised in the plurality of input values may be the same as the number of brakes of the vehicle. For example, for an aircraft having four brake-packs, the first plurality of input values will comprise four input values (one for each brake-pack). In principle, the input values may be values of any parameter relating to a brake-pack. Such parameters include (but are not limited to) brake-pack temperature, braking torque, and predicted brake-pack cooling time (that is, time for the brake-pack to cool from a current temperature to a predetermined target temperature). The input values may be measured values measured by a sensor of the vehicle. The input values may be calculated values calculated based on measured values. The input values may be current values, meaning that each input value represents the most recently measured state of the brake-pack with which that value is associated. In some examples the controller 10 is configured to continuously receive input values during a time period when the BTTC apparatus is operational. In some examples the controller 10 is configured to continuously or periodically receive current input values during a brake application. In some examples the controller 10 may be configured to receive input values in real or near-real time. Each input value may be comprised in a time-varying signal, which is continuously received by the controller 10 during operation of the BTTC apparatus.

The controller 10 is further configured to calculate an adjustment factor for each brake-pack based on the received first plurality of input values. The purpose of the adjustment factor is to redistribute braking pressure (or braking torque) between the plurality of brake-packs to achieve or promote a selected outcome. A conventional aircraft (that is, one not equipped with a BTTC apparatus according to the invention) will typically cause each brake-pack to be applied with equal pressure to achieve an overall brake pressure corresponding to a demanded amount of braking. As explained above, there are various scenarios in which it may be advantageous to vary the pressure (or torque) distribution between the brake-packs. The controller 10 achieves this by calculating different adjustment factors for each brake-pack, which adjust the amount of pressure applied by each brake-pack to be larger or smaller (or possibly the same) as the default equal pressure amount. In some examples the controller 10 may calculate a pressure adjustment factor for adjusting a default pressure amount, in other examples the controller 10 may calculate a torque adjustment factor for adjusting a torque corresponding to a default pressure amount. In such examples a torque feedback loop may be used to control the pressure applied by each brake during a braking application, so as to achieve the adjusted torque values.

The adjustment factors are calculated such that the scatter value of a subsequently received plurality of input values is less than or equal to the first scatter value. That is, the adjustment factors alter the distribution of braking pressure between the brake-packs in a manner so as to equalize (as far as possible) contemporaneous input values of the brake-packs. The adjustment factors are also calculated such that the overall brake pressure (or brake torque) is not altered. So, for example, if the pressure to be applied by one brake-pack is reduced by its adjustment factor, the pressure to be applied by at least one of the other brake-packs must be increased. An adjustment factor may, for example, be in the form of a coefficient which is multiplied together with a default equal brake pressure (or a default equal brake torque) to generate an adjusted brake pressure (or torque). In such examples the sum of the coefficients for all of the brake-packs may be 1. The controller 10 may be configured to continuously or periodically calculate updated adjustment factors, as new input values are received.

The controller 10 is further configured to output a control signal, via the communications link 12, to cause each brake-pack of the plurality of brake-packs to be applied at a pressure based on the adjustment factor calculated for that brake-pack. The control signal is output to the braking controller of the vehicle, either directly or via another vehicle system (such as an avionics system). The control signal may be of any suitable form which is receivable by the braking controller and usable by the braking controller to implement a braking application. The control signal may comprise a plurality of pressure values, each associated with a different brake-pack of the vehicle. The control signal may comprise a plurality of torque values, each associated with a different brake-pack of the vehicle. The plurality of pressure values (or torque values) may be adjusted pressure (or torque) values calculated using the adjustment factors. The control signal may be output continuously, or periodically, during a brake application. Information contained in the control signal may be updated over the course of a braking application. For example, an updated control signal may be output for each set of updated adjustment factors calculated by the controller 10.

The controller 10 is further configured to receive a second plurality of input values having a second scatter value. The second plurality of input values are of the same type as the first plurality of input values (that is, they are values of the same parameter). The second plurality of input values is received in the same manner as the first plurality of input values. In some examples the second plurality of input values are comprised in the same time varying signals as the first plurality of input values. The second plurality of input values is received at a later time than the first plurality of input values (it is assumed that the controller has not switched to a different operational mode between the first time and the later time). The second plurality of input values is received after the control signal has been output, and therefore after the brake-packs of the vehicle have been applied according to the calculated pressure adjustment values. A scatter value of the second plurality of input values should therefore be less than or equal to the first scatter value.

Figure 3:
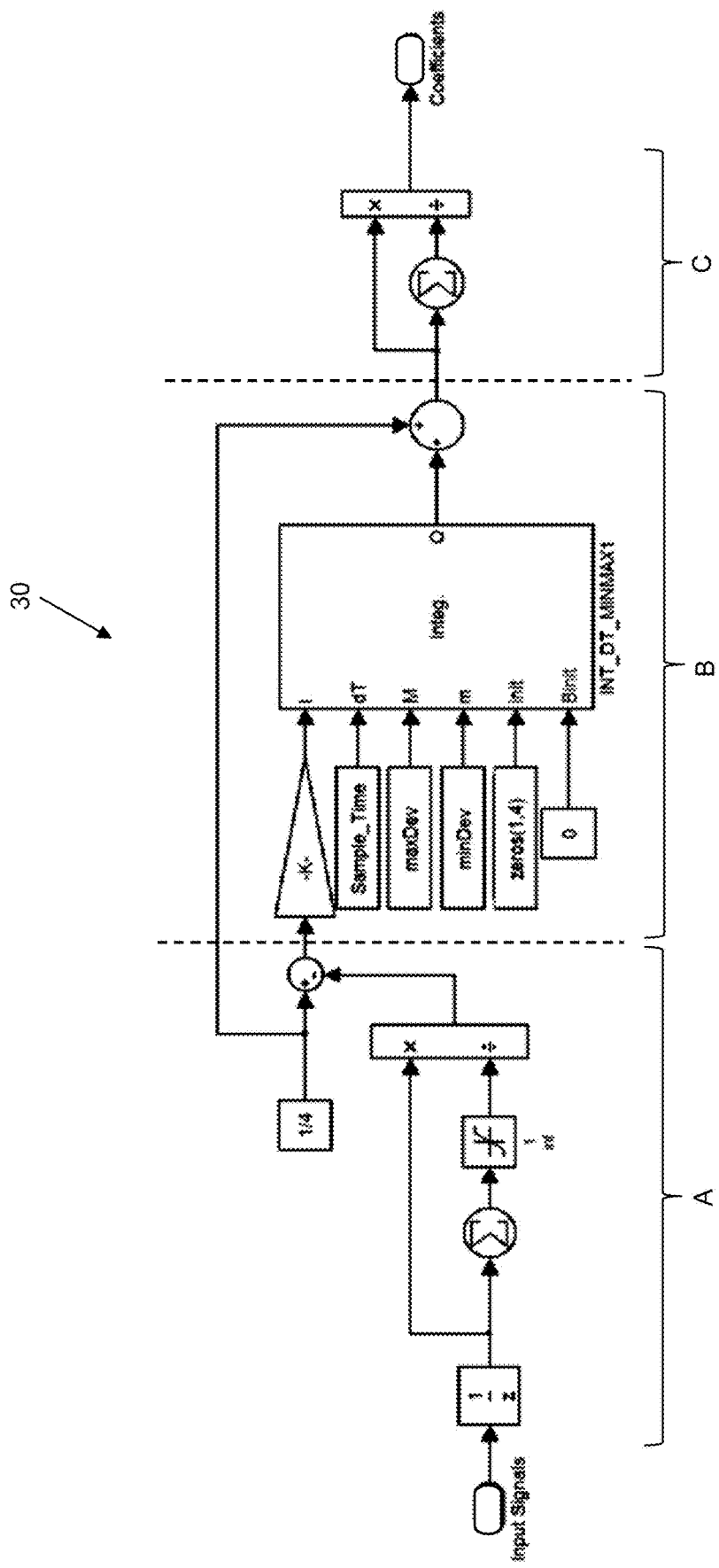
FIG. 3 shows a schematic view of an example controller for the apparatus of FIG. 1.

FIG. 3 shows the layout of a particular example controller 30 suitable for use as the controller 10 of the apparatus 1. The example controller 30 is configured for use on a vehicle having four braked wheels, and receives a time-varying input signal in respect of each braked wheel. Although single lines are shown in FIG. 2, the original input is a vector of four signals, and this is true throughout the controller, apart from where the four signals are summed into a single value.

The example controller 30 works on the assumption that each contemporaneous set of four input values (one for each of the four braked wheels) should be the same, each being 25% of the sum of the four input values. When this is not the case, regardless of what the input parameter may be, the controller 30 calculates the percentage contribution to the total sum from each input value, and hence finds the deviation from the required 25% contribution (part A). By integrating each input signal with respect to time, the controller calculates an adjustment factor for each input value. The adjustment factors comprise a set of four coefficients (one for each input value), which can be applied to a pressure demand signal to redistribute braking pressure between the braked wheels in a manner so as to reduce each deviation to 0 (part B). Once a coefficient has been calculated for each of the four input values, the four coefficients are normalized, ensuring that the sum of the four coefficients is equal to 1. This ensures that the overall braking pressure applied will not change from that which was demanded, even though the distribution may have changed.

In the particular illustrated controller, part A calculates the error between the demanded contribution and the actual contribution, part B applies a proportional integral derivative (PID) controller, and part C ensures that the sum is equal to 1. It will be appreciated that the parameters may vary from what is shown in FIG. 3, and certain terms may be omitted. The settings used for the integral control may vary according to which parameter is being controlled (i.e. which parameter the input values are values of). Generally, it is expected that the settings will be determined on a case by case basis, e.g. through experimentation to find settings which minimise response time without compromising performance.

It may be advantageous to control different parameters during different scenarios. For an aircraft, for example, it may be advantageous to control different parameters during different phases of a flight cycle. As such, in some examples the controller 10 is operable in a first mode in which each input value is a value of a first parameter, and in a second mode in which each input value is a value of a second, different, parameter. In such examples the BTTC apparatus 1 is configured to operate the controller 10 in either the first mode or the second mode in dependence on a current state of the vehicle. The controller 10 may further be operable in a third mode in which each input value is a value of a third parameter, different to the first and second parameters. In such examples the BTTC apparatus 1 may be configured to operate the controller 10 in either the first mode, the second mode or the third mode in dependence on a current state of the vehicle.

Three possible operational modes suitable for an aircraft application of the BTTC apparatus 1 will now be described. In the described example, the first mode controls the distribution of braking torques between the brake-packs, the second mode controls the distribution of predicted brake-pack cooling times, and the third mode controls the distribution of brake-pack temperatures.

Mode 1—Torque Control

During main landing braking of an aircraft (at speeds above a certain threshold, which may for example be about 30 knots) it is desirable to control the braking torque so that the torque exerted by each brake is equal, because equal torques result in a more consistent braking performance. As such, the BTTC apparatus 1 is configured to operate the controller 10 in the first (torque control) mode during the main landing braking phase of a flight cycle (that is, the main braking phase of a landing). If the brake gain differs between the brake-packs of the aircraft (as will almost certainly be the case in practice), each brake-pack will require a different amount of braking pressure to achieve the same overall torque. The controller 10 determines braking pressures suitable to achieve an equal torque distribution when operating in the first mode.

In the first mode each input value to the controller 10 comprises a torque value indicating an amount of torque reacted by a different one of the plurality of brake-packs. In the particular example, the input values are measured braking torque values (e.g. measured by torque sensors on the aircraft wheels). The controller 10 is configured to equalize these measured torque values by calculating coefficients for adjusting the demanded braking pressures, in the manner described above in relation to FIG. 2. The controller 10 forms part of a feedback loop, and thereby continually updates the coefficients during the time period in which it is operating in the first mode, to achieve or maintain an equal torque distribution between all of the brake-packs. The relationship between braking pressure and braking torque is simple and direct, meaning that once an equal distribution has been achieved, further significant changes to the coefficients are unlikely to be required in order to maintain the equal distribution.

Operating the controller 10 in the first (torque control) mode can advantageously improve braking performance, for the reasons described above. However; it may not necessarily improve the aircraft turnaround time because the first mode does not take brake temperature or predicted brake cooling time into account. As such, the BTTC apparatus 1 may be configured to operate the controller in the first mode only under certain circumstances (e.g. when maximising braking performance is of particular importance, such as during the main braking phase of a landing). In some examples the BTTC apparatus 1 may be configured to operate the controller 10 in the first mode and not in any of the other modes, for as long as certain predetermined conditions for operating in the first mode are met.

In some examples the BTTC apparatus 1 comprises at least one predefined first mode criterion, and is configured to operate in the first mode if the at least one predefined first mode criterion is met. For example, the at least one predefined first mode criterion may comprise a minimum ground speed and be defined such that it is met when a measured ground speed is greater than the minimum ground speed. In some examples the minimum ground speed is equal to a threshold speed for differentiating a main landing phase from a taxi-in phase. In some examples the minimum ground speed is 30 knots, such that the at least one predefined first mode criterion is only met during the main braking phase of a landing. The minimum ground speed may be at least 30 knots. The at least one predefined first mode criterion may be part of software control logic of the BTTC apparatus 1, or may be stored in a memory comprised in or accessible to the BTTC apparatus 1.

Mode 2—Cooling Time Control

During taxiing immediately after landing the aircraft ground speed is significantly less than during main landing braking (generally less than 30 knots), meaning that optimal brake performance is less important. During this phase of the flight cycle the brake-pack temperatures are generally above the temperature required for pushback, so it is desirable to cool the brake-packs as quickly as possible in order to achieve an optimal aircraft turnaround time. The second (cooling time control) mode is configured to reduce or minimize the total cooling time (that is, the time required for all brake-packs to reach an acceptable pushback temperature) by distributing the braking energy between all of the brake-packs so as to harmonize predicted cooling times (to a predefined target temperature) of the brake-packs. The predefined target temperature may be a pushback temperature.

The peak temperature reached by a brake-pack during a braking application is dependent on the amount of energy put into the brake-pack during that braking application (which will vary with brake gain) and the mass of the brake-pack. The time required for a brake-pack to cool down is dependent on the current temperature of the brake-pack and the mass of the brake-pack (along with other factors which will be common to all the brake-packs, such as ambient temperature). A predicted cooling time can be calculated for each brake by determining the peak temperature reached by that brake-pack, and then determining a time for that brake to cool from the peak temperature to the predefined target temperature.

The predicted cooling times can be calculated by the controller 10. Alternatively, the predicted cooling times can be calculated by a separate brake cooling time prediction system configured to provide cooling time prediction information to the controller 10. Any suitable technique may be used to calculate predicted brake-pack cooling times. An example of a suitable system and process for calculating a predicted cooling time of a brake is described in European patent application no. 17168146.3.

In the second (cooling time control) mode each input signal to the controller comprises a cooling time value indicating a predicted time required for a different one of the plurality of brake-packs to reach a predetermined temperature. The cooling time values may change during the time period in which the controller 10 is operating in the second mode, due to changes in ambient conditions, further brake applications, and so on, which occur during this time period. The controller 10 continually or periodically receives updated cooling time values for each brake-pack during the time period in which it is operating in the second mode. When operating in the second mode, the controller 10 is configured to calculate coefficients for adjusting the demanded braking pressures so as to equalize (or at least minimize the deviation in) the predicted cooling times, in the manner described above in relation to FIG. 2. The controller may continually or periodically update the calculated coefficients during the period in which it is operating in the second mode, based on the most recently received predicted cooling time data.

Unlike the relationship between braking torque and braking pressure, the relationship between braking pressure and brake-pack cooling time is not simple (partly due to the influence of external factors on cooling times—such external factors may include one or more of ambient temperature, direct sunlight, wind speed and direction, and the like). Consequently, it is likely that the calculated coefficients will vary significantly during a given time period in which the controller 10 is operating in the second mode (which may, e.g., correspond to part or all of a taxiing-in flight cycle phase).

Reducing the scatter between brake-pack cooling time values is an effective way of reducing aircraft turn-around times. Therefore, it may generally be desirable for the controller 10 to operate in the second mode whenever braking performance is not critical. In some examples the BTTC apparatus 1 is configured to operate the controller 10 in the second mode whenever the conditions for operating the controller in the first mode are not met. In some examples the BTTC is configured to operate the controller in the second mode whenever the conditions for operating the controller in the first mode are not met and conditions for operating the controller in the third mode are not met.

In some examples the BTTC apparatus comprises at least one predefined second mode criterion, and is configured to operate in the second mode if the at least one predefined second mode criterion is met. For example, the at least one predefined second mode criterion may comprise a maximum ground speed and may be defined such that it is met when a measured ground speed is less than (or is less than or equal to) the maximum ground speed. In some examples the maximum ground speed is equal to a threshold speed for differentiating a main landing phase from a taxi-in phase. In some examples the maximum ground speed is 30 knots. The maximum ground speed may be at least 30 knots. The maximum ground speed may be the same as a minimum ground speed comprised in a predefined first mode criterion. In some examples the at least one predefined second mode criterion is defined such that it is only met when the at least one predefined first mode criterion is not met. In some examples the at least one predefined second mode criterion may comprise a requirement that the at least one predefined first mode criterion is not met, and/or a requirement that at least one predefined third mode criterion (e.g. as described below) is not met. In some examples the at least one predefined second mode criterion is defined such that it is only met if all brake-pack temperatures are above the predefined target temperature. The at least one predefined second mode criterion may be defined such that it is only met during a taxi-in phase of a flight cycle. The at least one predefined second mode criterion may be part of software control logic of the BTTC apparatus 1, or may be stored in a memory comprised in or accessible to the BTTC apparatus 1.

Third Mode—Temperature Control

In the third (temperature control) mode each input signal to the controller comprises a brake-pack temperature value indicating the temperature of a different one of the plurality of brake-packs. The brake-pack temperature values may be measured values, e.g. measured by brake temperature sensors of the aircraft. Alternatively the brake-pack temperature values may be calculated values, e.g. calculated by a brake temperature calculating function. Such a function may be comprised in the BTTC 1, in a brake cooling time prediction system, or in any other system of the aircraft. Brake-pack temperature values may be calculated, for example, based on a measured braking torque for a given brake and a known mass of the given brake.

The brake-pack temperature values may change during the time period in which the controller 10 is operating in the third mode, due to changes in ambient conditions, further brake applications, and so on, which occur during this time period. The controller 10 continually or periodically receives updated temperature values for each brake-pack during the time period in which it is operating in the third mode. When operating in the third mode, the controller 10 is configured to calculate coefficients for adjusting the demanded braking pressures so as to equalize (or at least minimize the deviation in) the brake-pack temperatures, in the manner described above in relation to FIG. 2. The controller 10 may continually or periodically update the calculated coefficients during the period in which it is operating in the third mode, based on the most recently received brake-pack temperature values.

Reducing the scatter of peak brake-pack temperatures does not generally result in reduced turnaround times, and so it is not generally advantageous to control the brake-pack temperature distribution during the taxi-in phase, assuming that the brake-packs are hot enough to require a significant cooling period. However, if at least one of the brake-packs is below the target temperature during a period when the conditions for operating the controller in the first mode are not met (that is, during a taxiing phase when the ground speed is relatively low), it may be desirable to operate the controller 10 in a third (temperature control) mode. In the third mode the controller 10 is configured to equalize (as far as possible) the distribution of peak brake-pack temperatures. If one or more of the brake-packs is below the target temperature used to calculate cooling time values it will have a cooling time value of 0, meaning that the second mode will not operate effectively.

It could occur that one or more of the brake-packs drops below (or never exceeds in the first place) the target temperature (that is, the predefined target temperature used to calculate the cooling time values) during the taxi-in phase. If all of the brake-packs are below the target temperature during the taxi-in phase, it may be advantageous to operate the controller 10 in the third mode rather than in the second mode. It is also advantageous to use the third mode during the taxi-out phase, because it can minimize the risk of one or more of the brake-packs becoming unacceptably hot during taxi-out.

During the taxi-out phase short brake applications (taxi snubs) are expected to occur. These snubs may cause the temperature of one or more of the brake-packs to rise above the predefined target temperature used to calculate the cooling time values. This is acceptable as long as none of the brake-pack temperatures rise high enough to force a 'Brakes Hot' warning, which occurs when a certain predefined threshold temperature (higher than the target cooling temperature) is reached). A different, higher, target temperature value may therefore be defined in respect of the third mode, as will be explained below. The likelihood of the 'Brakes Hot' threshold being reached can be minimized by distributing the braking pressure between the brake-packs in a manner such that the temperature distribution of the brake-packs is equalized (as far as possible).

In some examples the BTTC apparatus 1 is configured to operate the controller 10 in the third mode whenever certain conditions are met. In some examples the BTTC apparatus 1 is configured to operate the controller 10 in the third mode whenever the conditions for operating the controller 10 in the first mode are not met and the conditions for operating the controller 10 in the second mode are not met.

In some examples the BTTC apparatus 1 comprises at least one predefined third mode criterion, and is configured to operate the controller 10 in the third mode if the at least one predefined third mode criterion is met. For example, the at least one predefined third mode criterion may comprise a maximum ground speed and may be defined such that it is met when a measured ground speed is less than (or is less than or equal to) the maximum ground speed. In some examples the maximum ground speed is 30 knots. The maximum ground speed may be the same as a minimum ground speed comprised in a predefined first mode criterion. The maximum ground speed may be the same as a maximum ground speed comprised in a predefined second mode criterion. In some examples the at least one predefined third mode criterion is defined such that it is only met when the at least one predefined first mode criterion is not met. In some examples the at least one predefined second mode criterion may comprise a requirement that the at least one predefined first mode criterion is not met, and/or a requirement that at least one predefined second mode criterion is not met. In some examples the at least one predefined third mode criterion is defined such that it is only met if at least one brake-pack temperature is below a predefined threshold temperature. In some examples the at least one predefined third mode criterion may be defined such that it is only met during a taxi-out phase of a flight cycle. The at least one predefined third mode criterion may be part of software control logic of the BTTC apparatus 1, or may be stored in a memory comprised in or accessible to the BTTC apparatus 1.

A different predefined threshold temperature may be defined for different scenarios and/or different aircraft states. For example, a different predefined threshold temperature may be defined for different flight cycle phases. In particular, during landing and taxi-in the predefined threshold temperature may be the target temperature used to calculate cooling time values (which may correspond to a maximum pushback temperature), whereas during taxi-out the predefined threshold temperature may be a maximum takeoff temperature. Using different threshold temperatures in this particular manner ensures that the third mode is used for the whole of the taxi-out phase (which is advantageous because brake-pack temperature equalization is most desirable during this phase), and that the second mode is used as much as possible during taxi-in (which is advantageous because brake-pack cooling time equalization is most desirable during this phase).

The example BTTC apparatus 10 described above selects a mode of operation for the controller 10 based on vehicle state information. Where the vehicle is an aircraft, such vehicle state information may be indicative of a current flight cycle phase of the aircraft. The vehicle state information may comprise measurement data generated by sensors of the vehicle, such as current ground speed, or current brake-pack temperature. However, alternative examples are envisaged in which the vehicle state information is received from an avionics or cockpit system of an aircraft. For example, an avionics system may provide an indication of the current flight cycle phase of the aircraft to the BTTC apparatus 1. An avionics system may determine a current flight cycle phase of the aircraft in any suitable manner, including by receiving a manual input from flight crew. Further examples are envisaged in which the controller 10 may be manually switched from one mode to another by the flight crew, in which cases the BTTC apparatus 1 is configured to receive a control signal from a cockpit system indicating a desired operational mode.

Figure 4:
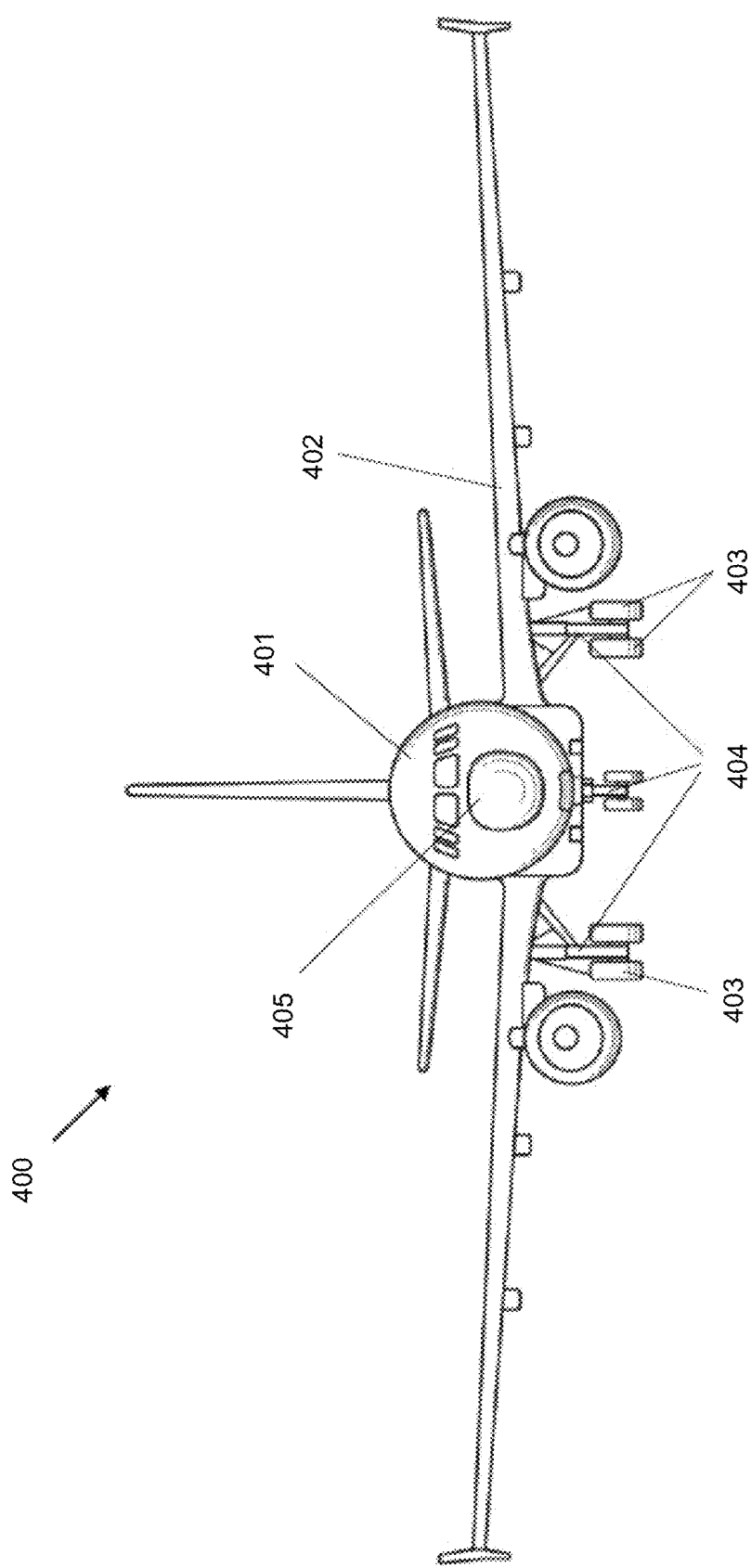
FIG. 4 is a schematic view of an example aircraft comprising an apparatus according to an example.

FIG. 4 shows an aircraft 400 on which a BTTC apparatus according to the examples (e.g. the BTTC apparatus 1) is installed. The aircraft comprises a fuselage 401, wings 402, and main and nose landing gear 404. Two wheels 403 are attached to each landing gear 404. Each wheel 403 has an associated brake-pack (not visible) for braking that wheel. The brake-packs may be carbon brake-packs. The aircraft 400 further comprises a brake cooling prediction system for predicting a time required by each brake-pack to reach a predetermined temperature. The brake cooling prediction system is configured to provide cooling time values for each brake-pack to the BTTC apparatus. The brake cooling system may be in communication with sensors of the aircraft 400 to obtain measurement data for use in generating cooling time values.

Each brake-pack has an associated sensor apparatus, in particular a torque sensor configured to measure the torque reacted by that brake-pack. The sensor apparatus associated with a given brake-pack may also comprise any other sensor for measuring a parameter relating to the brake-pack or its associated wheel, such as a brake temperature sensor, a wheel speed sensor, a tyre pressure sensor, an environmental sensor or the like. At least the torque sensors are configured to provide measured values for each brake-pack to the BTTC apparatus. The torque sensors may also be configured to provide measured torque values for each brake-pack to a brake temperature calculating function. Temperature values for each brake-pack may then be calculated by the brake temperature calculating function, based on the measured torque values and known brake masses, and the calculated temperature values provided to the BTTC. Alternatively, in examples where each sensor apparatus comprises a brake temperatures sensor, the plurality of brake temperature sensors may be configured to provide measured temperature values for each brake-pack to the BTTC. Some or all of the sensors of the brake-pack sensor apparatus may be in communication with the brake cooling prediction apparatus.

The BTTC apparatus is configured to receive the first plurality of input values and the second plurality of input values from a selected source. The selected source is one or more of: the torque sensors, temperature sensors, a brake temperature calculating function; the brake cooling prediction system. The source is selected based on a current state of the aircraft, e.g. in the manner described above in relation to the operation of the BTTC apparatus 1. The aircraft 400 further comprises a ground speed sensor. In some examples the ground speed sensor is in communication with the BTTC apparatus and the BTTC apparatus is configured to receive ground speed information from the ground speed sensor. In such examples the BTTC apparatus may select the source based on received ground speed information. In some examples the BTTC is configured to receive brake temperature information (e.g. from a brake temperature calculating function or from a plurality of brake temperature sensors) and to select the source based on the received brake temperature information.

The aircraft 400 further comprises a braking control system (not shown), and in some examples the BTTC apparatus is configured to output the control signal to the braking control system to cause each of the brake-packs to be applied at the pressure.

The aircraft 400 further comprises an avionics system 405, and in the particular example the BTTC apparatus, the brake cooling prediction system and the braking control system are all comprised in the avionics system 405. The avionics system 405 is located in an avionics bay or compartment. In the particular example the avionics bay is in the nose of the aircraft below the cockpit, but it may be in a different location depending on the type of aircraft.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Where the term "or" has been used in the preceding description, this term should be understood to mean "and/or", except where explicitly stated otherwise.

The invention claimed is:

1. An apparatus for controlling braking of a vehicle having a plurality of brake-packs, the apparatus comprising a controller configured to:

receive a first plurality of input values having a first scatter value, wherein each input value of the first plurality of input valves relates to a different one of the plurality of brake-packs;

calculate an adjustment factor for each brake-pack of the plurality of brake packs based on the received first plurality of input values;

output a control signal to cause each of the brake-packs of the plurality of brake-packs to be applied at a pressure based on the adjustment factor calculated for that brake-pack; and receive a second plurality of input values after each of the plurality of brake-packs apply pressure in response to the output control signal, wherein the second plurality of input values have a second scatter value;

wherein the adjustment factors are calculated such that the second scatter value is less than or equal to the first scatter value, wherein the controller is operable in a first mode in which each of the plurality of input values is a value of a first parameter of the plurality of brake packs, and in a second mode in which each of the plurality of input values is a value of a second parameter of the plurality of brake packs different from the first parameter, wherein the apparatus is configured to operate the controller in the first mode if a predefined first mode criterion is met, and to operate the controller in the second mode if a predefined second mode criterion is met, and wherein the predefined first mode criterion comprises a minimum ground speed of the vehicle, and the predefined first mode criterion is met when a ground speed of the vehicle is greater than the minimum ground speed.

2. The apparatus according to claim 1, wherein in the first mode each input value of the first parameter is a torque value indicating an amount of torque reacted by a different one of the plurality of brake-packs, and in the second mode each input value of the second parameter is a cooling time value indicating a predicted time required for a different one of the plurality of brake-packs to reach a predetermined temperature.

3. The apparatus according to claim 1, wherein the predefined second mode criterion comprises a maximum ground speed of the vehicle, and is defined such that the second mode criterion is met when a ground speed of the vehicle is less than the maximum ground speed.

4. The apparatus according to claim 1, wherein the predefined second mode criterion comprises a minimum brake temperature, and is defined such that it is met when the temperatures of the brake-packs of the vehicle are all above the minimum brake temperature.

5. The apparatus according to claim 1, wherein the apparatus is configured to receive vehicle state information comprising one or more of:

current ground speed of the vehicle;
temperature of each brake-pack;
current flight cycle phase; and
the apparatus is configured to select an operating mode of the controller based on the received vehicle state information.

6. An apparatus according to claim 1, wherein the vehicle is an aircraft.

7. The apparatus according to claim 1, wherein each brake-pack is a carbon brake-pack.

8. The apparatus according to claim 1, wherein the first parameter and the second parameters are each one of brake torque applied to each of the plurality of brake packs, brake temperature of each of the plurality of brake pacts, and brake cooling time of each of the plurality of brake packs.

9. An apparatus for controlling braking of a vehicle having a plurality of brake-packs, the apparatus comprising a controller configured to:
receive a first plurality of input values having a first scatter value, wherein each input value of the first plurality of input valves relates to a different one of the plurality of brake-packs;
calculate an adjustment factor for each brake-pack of the plurality of brake packs based on the received first plurality of input values and the adjustment factor is calculated to reduce the first scatter value;
output a control signal to cause each of the brake-packs of the plurality of brake-packs to apply a braking pressure based on the adjustment factor calculated for the brake-pack; and
receive a second plurality of input values having a second scatter value, wherein each input value of the second plurality of input valves relates to a different one of the plurality of brake-packs and the second scatter value is smaller than the first scatter value;
wherein the controller is operable in a first mode in which each of the input values is a value of a first parameter, and in a second mode in which each of the input values is a value of a second parameter different from the first parameter;
wherein the apparatus is configured to operate the controller in either the first mode or the second mode based on a current state of the vehicle;
wherein the controller is further operable in a third mode in which each of the input values is a value of a third parameter, different than the first and second parameters, and
wherein the apparatus is configured to operate the controller in the third mode if a predefined third mode criterion is met.

10. The apparatus according to claim 9, wherein the third parameter is brake-pack temperature, and wherein the predefined third mode criterion comprises a maximum ground speed of the vehicle and a minimum brake temperature, and is defined such that the predefined third mode criterion is met when a ground speed of the vehicle is less than the maximum ground speed and the temperature of at least one brake-pack is below the minimum brake temperature.

11. An aircraft comprising:
a plurality of brake-packs;
a plurality of torque sensors, wherein each torque sensor being configured to measure a torque reacted by a different one of the plurality of brake-packs;
a source of brake temperature information, wherein the brake temperature information is for generating a value of the temperature of each different one of the plurality of brake-packs;
a brake cooling prediction system for predicting a time required by each brake-pack of the plurality of brake packs to reach a predetermined temperature; and
the apparatus according to claim 1 and in communication with the plurality of torque sensors, the source of brake temperature information, and the brake cooling prediction system;
wherein the apparatus is configured to receive the first plurality of input values and the second plurality of input values from a selected source comprising one of: the plurality of torque sensors; the source of brake temperature information; and the brake cooling prediction system, wherein the source is selected based on a current state of the aircraft.

12. The aircraft according to claim 11, further comprising a ground speed sensor in communication with the apparatus, wherein the apparatus is configured to receive ground speed information from the ground speed sensor and to select the ground speed sensor as the selected source based on the received ground speed information.

13. The aircraft according to claim 11, wherein the apparatus is configured to receive the brake temperature information from the source of brake temperature information and to select the source of brake temperature information based on the received brake temperature information.

14. A method of braking an aircraft having a braking system with brake packs configured to apply braking forces to wheels of the aircraft, the method including:
operating a controller of the braking system in a first mode if a ground speed of the aircraft exceeds a predefined minimum ground speed and operating the controller in a second mode if the ground speed of the aircraft is slower than the predefined minimum ground speed;
receiving by a controller a first group of input values, wherein the input values represent brake torque or brake pressure while the controller operates in the first mode and the input values represent brake cooling time while the controller operates in the second mode;
while the controller operates in the first and second modes, calculating a scatter value based on the first group of input valves;
calculating by the controller, while operating in the first and second modes, an adjustment factor for each of the brake packs based on the received first group of input values, wherein the adjustment factor is calculated to reduce the scatter value;
outputting by the controller, while operating in the first and second modes, a control signal to cause each of the brake packs to apply a pressure to brake the wheels of the aircraft, wherein the pressure applied by each of the brake packs depends on the adjustment factor for the brake pack, and the pressure applied by at least one of the brake-packs differs from the pressure applied by another one of the brake-packs, and
after outputting the control signal, receiving by the controller and while operating in the first and second modes, a second group of the input values each corresponding to a respective one of the brake packs, wherein a scatter value for the second group of the input valves is less than the scatter value for the first group of the input valves.

* * * * *